(12) United States Patent
Millner et al.

(10) Patent No.: US 7,616,462 B2
(45) Date of Patent: Nov. 10, 2009

(54) POWER SUPPLY CONTROLLER TO ACTIVELY DRIVE A LOAD CURRENT WHEN THE LOAD CURRENT EXCEEDS A SET POINT

(75) Inventors: Alan Roy Millner, Lexington, MA (US); Ilya Bystryak, Salem, MA (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 11/077,555

(22) Filed: Mar. 9, 2005

(65) Prior Publication Data
US 2005/0219875 A1    Oct. 6, 2005

Related U.S. Application Data

(60) Provisional application No. 60/552,691, filed on Mar. 12, 2004.

(51) Int. Cl.
*H02M 7/5387* (2007.01)
(52) U.S. Cl. .................. 363/63; 363/56.03; 363/132
(58) Field of Classification Search .............. 363/63, 363/17, 98, 132, 56.02–56.04, 56.07–56.1; 361/93.9, 93.1, 18
See application file for complete search history.

(56) References Cited

U.S. PATENT DOCUMENTS 4,562,386 A * 12/1985 Goff et al. ............... 318/254
4,633,358 A * 12/1986 Nagano ..................... 361/31
5,245,523 A *  9/1993 Juzswik ................. 363/56.03
5,303,139 A *  4/1994 Mark ........................ 363/63
5,309,347 A *  5/1994 Poma et al. ................. 363/63

(Continued)

FOREIGN PATENT DOCUMENTS

EP          0 259 005          3/1988

(Continued)

OTHER PUBLICATIONS

Notification of Transmittal of the International Search Report and the Written Opinion of the International Searching Authority, or the Declaration of International Patent Application No. PCT/US2005/007892, (Nov. 7, 2005).

(Continued)

*Primary Examiner*—Adolf Berhane
*Assistant Examiner*—Harry Behm
(74) *Attorney, Agent, or Firm*—Proskauer Rose LLP

(57) ABSTRACT

A control circuit for a switching power supply reacts to an over current condition in the switching power supply to bring its operating point to a safe condition. The control circuit senses both the direction and the magnitude of the load current in the switching power supply, and then uses this sensed information to control the active power switches in the switching power supply. In an over current condition, the switches are controlled to actively drive the load current toward zero, even if the sensed information is delayed or heavily filtered, or the switch signals from the control circuit are delayed in reaching the switches. The resulting operation of the switching power supply is more resistant to abnormal load conditions and is maintained in the presence of transient short circuits or arcs. The switching power supply hardware is also better protected.

21 Claims, 3 Drawing Sheets

U.S. PATENT DOCUMENTS

| | | | |
|---|---|---|---|
| 5,428,522 A * | 6/1995 | Millner et al. | 363/63 |
| 5,773,991 A * | 6/1998 | Chen | 324/772 |
| 6,119,046 A | 9/2000 | Sporer | 700/12 |
| 6,150,628 A | 11/2000 | Smith et al. | 219/121.54 |
| 6,329,801 B1 * | 12/2001 | Zuniga et al. | 323/285 |
| 6,351,359 B1 * | 2/2002 | Jaeger | 361/93.9 |
| 6,552,296 B2 | 4/2003 | Smith et al. | 219/121.43 |
| 6,735,099 B2 * | 5/2004 | Mark | 363/63 |
| 6,815,633 B1 * | 11/2004 | Chen et al. | 219/121.54 |
| 6,856,119 B2 * | 2/2005 | Crawford | 320/166 |
| 6,859,087 B2 * | 2/2005 | Galli et al. | 327/423 |
| 7,031,124 B2 * | 4/2006 | Takahashi | 361/30 |
| 2004/0109276 A1 | 6/2004 | Mendenhall | 361/100 |
| 2004/0125620 A1 | 7/2004 | Yamashita | 363/21.01 |
| 2004/0201937 A1 | 10/2004 | Yoshida | 361/93.7 |
| 2004/0227498 A1 | 11/2004 | Okada | 323/285 |

FOREIGN PATENT DOCUMENTS

| | | |
|---|---|---|
| JP | 04 281342 A | 10/1992 |

OTHER PUBLICATIONS

L. H. Dixon, Jr., "Switching Power Supply Topology Review," Unitrode Corporation and Texas Instruments Inc., Copyright 2001, 14 pages.

* cited by examiner

POWER SUPPLY CONTROLLER TO ACTIVELY DRIVE A LOAD CURRENT WHEN THE LOAD CURRENT EXCEEDS A SET POINT

RELATED APPLICATIONS

This application claims priority of U.S. Provisional Application Ser. No. 60/552,691 filed Mar. 12, 2004.

FIELD OF THE INVENTION

The invention relates to methods and systems for controlling a switching power supply.

BACKGROUND OF THE INVENTION

A switching power supply can be implemented using conventional circuit topologies such as, for example, a push-pull converter, a half-bridge converter, a pulse width modulated full-bridge converter, or a phase modulated full-bridge converter. For each of these converter circuits, if the load current grows too large, a control circuit responds by changing the state of one or more switches in the converter circuit to limit the load current. Conventional control circuits sense only the magnitude of the load current and, if determined to be too large, terminate the active current driving pulse or shut down the converter circuit altogether.

With these conventional control circuits, however, the high current condition may persist after pulse termination due to a lack of load voltage to drive the current down, overheating the circuit elements. This commonly occurs in plasma generation situations due to the low impedance of a plasma after ignition. Or, the delay in sensing the over current condition in the load and then changing the state of the converter circuit's switches may be too long. Accordingly, in many converter circuits, the state of a switch may be changed too late (i.e., during the following opposite polarity portion of the switching cycle). This can slow, rather than quicken, the correction of the load current. In particular, the load current may fail to return to zero and instead continue to have a single polarity over several switching cycles. This can interrupt the power conversion process or destroy the converter circuit's elements. Moreover, the resulting load current waveform may have multiple transitions, causing excessive dissipation in the switching elements.

It is therefore an object of this invention to provide systems and methods for controlling a switching power supply. Another object of the invention is to provide systems and methods for controlling a power supply to rapidly return to a normal operating condition.

SUMMARY OF THE INVENTION

The present invention relates to a control circuit for a switching power supply. In addition to sensing the magnitude of the switching power supply's load current, the control circuit of the present invention also senses the direction of the load current. Upon determining an over current condition to have occurred in the load, the control circuit uses the sensed information to set the state of the power supply's switches to drive the load current back towards zero. The control circuit then maintains that state of the power supply's switches until the load current is sensed by the control circuit to have actually returned to zero or to a safe operating value. At that point, the control circuit resumes driving the power supply's switches in their normal sequence.

In comparison to conventional control circuits for switching power supplies, the control circuit of the present invention has greater tolerance for delays in sensing the over current condition, as well as for delays in changing the state of the power supply's switches. For example, delays of over a large fraction of a switching period are tolerated. While such delays result in a larger instantaneous current error, the control circuit of the present invention nevertheless responds to restore a safe operating condition for the switching power supply.

Higher switching frequencies, slower sensing circuits, and slower switch drive circuits at a given switching frequency may be used in conjunction with the inventive control circuit and the switching power supply it controls. Accordingly, lower cost with better performance is achieved.

The invention, in one aspect, features a system for controlling a switching power supply. The system includes a voltage supply and a plurality of switches connected to the voltage supply to change a current flow path from the voltage supply to an electrical load. The system also includes a control circuit that varies a state of at least one of the plurality of switches, to change the current flow path and to drive a load current magnitude towards a desired value, based on whether the load current magnitude has exceeded a set point in at least one of a positive and negative direction.

In some embodiments, the state of the at least one of the plurality of switches is maintained until the load current magnitude satisfies at least one operating criterion. In some embodiments, the state of the at least one of the plurality of switches is maintained until the load current magnitude is substantially equal to zero. In some embodiments, the state of the at least one of the plurality of switches is maintained until the load current magnitude is below a predetermined operating value.

The system can include a sensor to sense the load current. In some embodiments, the control circuit is implemented in a manner selected from the group consisting of, for example, an integrated circuit, a program in a processor element, a programmable logic element, and a set of discrete logic and control elements. In some embodiments, the voltage supply is a DC voltage supply or an AC voltage supply. In some embodiments, the switching power supply outputs a DC voltage or an AC voltage.

In some embodiments, the system has four switches, wherein the states of two of the switches are changed to change the current flow path. In some embodiments, the plurality of switches are configured in a switching topology selected from the group consisting of a push pull converter, a half bridge converter, and a full bridge converter. The system also can include reverse polarity diodes disposed relative to the plurality of switches to protect the switches from reverse current flow.

In some embodiments, the electrical load comprises a primary winding and a magnetic core coupled to a secondary winding (e.g., a toroidal plasma). In some embodiments, in the absence of the load current magnitude exceeding the set point in at least one of the positive and negative direction, the switches are controlled by pulse width modulation, phase modulation, or pulse frequency modulation.

In another aspect of the invention, a system for controlling a switching power supply includes a voltage supply that supplies a load current that alternates between a positive and negative direction. The system also includes a control circuit that changes the current flow path from the voltage supply to an electrical load and drives the current magnitude towards a desired value, based on whether the load current magnitude has exceeded a set point in at least one of the positive and negative direction.

The invention, in one aspect, relates to a method for controlling a switching power supply. The method involves determining the magnitude and direction of a load current that alternates between a positive direction and a negative direction. The method also involves determining whether the load current magnitude has exceeded a set point in at least one of the positive and negative direction. The method also involves driving the load current in the opposite direction when the load current magnitude has exceeded the set point in the at least one of the positive and the negative direction.

The method for controlling a switching power supply can involve changing the state of one or more switches in a switching power supply to drive the load current in the opposite direction. In some embodiments, the state of the one or more switches is maintained until the load current magnitude is substantially equal to zero. In some embodiments, the state of the one or more switches is maintained until the load current magnitude is below a predetermined operating value. In some embodiments, the least one of the magnitude and direction of the load current is determined by an electrical measurement. The at least one of the magnitude and direction of the load current can be inferred. The magnitude and direction of the load current can be inferred based on use of at least one of a model, a simulation, or a measurement. In some embodiments, the method also involves supplying power to an electrical load. The electrical load can include a primary winding and a magnetic core coupled to a secondary winding (e.g., a toroidal plasma).

In another aspect, the invention features a system for controlling a switching power supply that includes a voltage supply. The system also includes means for changing a current flow path from a voltage supply to an electrical load and for driving a current magnitude towards a desired value, based on whether a load current magnitude has exceeded a set point in at least one of a positive and negative direction.

In another aspect, the invention relates to a control circuit for a switching power supply. The switching power supply has a load current that alternates between a positive direction and a negative direction. The control circuit senses the magnitude and the direction of the load current, and establishes a condition when the load current exceeds a set limit in at least one of the positive and the negative directions. When the load current exceeds the set limit in one of the positive and the negative directions, the control circuit changes the state of one or more switches in the switching power supply to drive the load current in the opposite direction. The control circuit maintains the changed state of the switches until it senses that the load current has returned to zero or to a safe operating value.

Various embodiments of this aspect of the invention include the following features. In one embodiment, the switching power supply is a DC to AC converter. Optionally, to produce a DC output and thereby realize a DC to DC converter, the output of the DC to AC converter may be passed through a rectifier and, for example, a filter. In another embodiment, the switching power supply is an AC to AC converter. The switching power supply may have the switch topology of a push pull converter, a half bridge converter, or a full bridge converter. In another embodiment, the switching power supply is a pulse width modulated converter. Alternatively, the switching power supply is a phase modulated converter.

In yet another embodiment, the switches in the switching power supply include reverse polarity diodes. Alternatively, the switches are actively controlled for reverse current flow. The switches may be metal oxide semiconductor field effect transistors, bipolar transistors, insulated gate bipolar transistors, silicon controlled rectifiers, or other gate controlled switch devices.

In one embodiment, the control circuit directly measures the load current magnitude and/or direction. In another embodiment, the load current magnitude and/or direction is inferred by the control circuit from a model, a real time simulation, or by using sensed parameters other than the load current. The control circuit may be implemented as a part of the switching power supply's main control mechanism. Alternatively, the control circuit is implemented as a protective mechanism separate from the switching power supply's main control mechanism. The control circuit may be implemented as an integrated circuit, as a set of discrete logic and control elements, as a programmable logic element, or as a program in a processor element. Moreover, the control circuit may be applied to the control of any of a variety of apparatus, including a toroidal plasma source and other types of plasma loads.

The foregoing and other objects, aspects, features, and advantages of the invention will become more apparent from the following description and from the claims.

BRIEF DESCRIPTION OF THE DRAWINGS

The foregoing and other objects, features and advantages of the invention, as well as the invention itself, will be more fully understood from the following illustrative description, when read together with the accompanying drawings which are not necessarily to scale.

DETAILED DESCRIPTION OF ILLUSTRATIVE EMBODIMENTS

Figure 1:
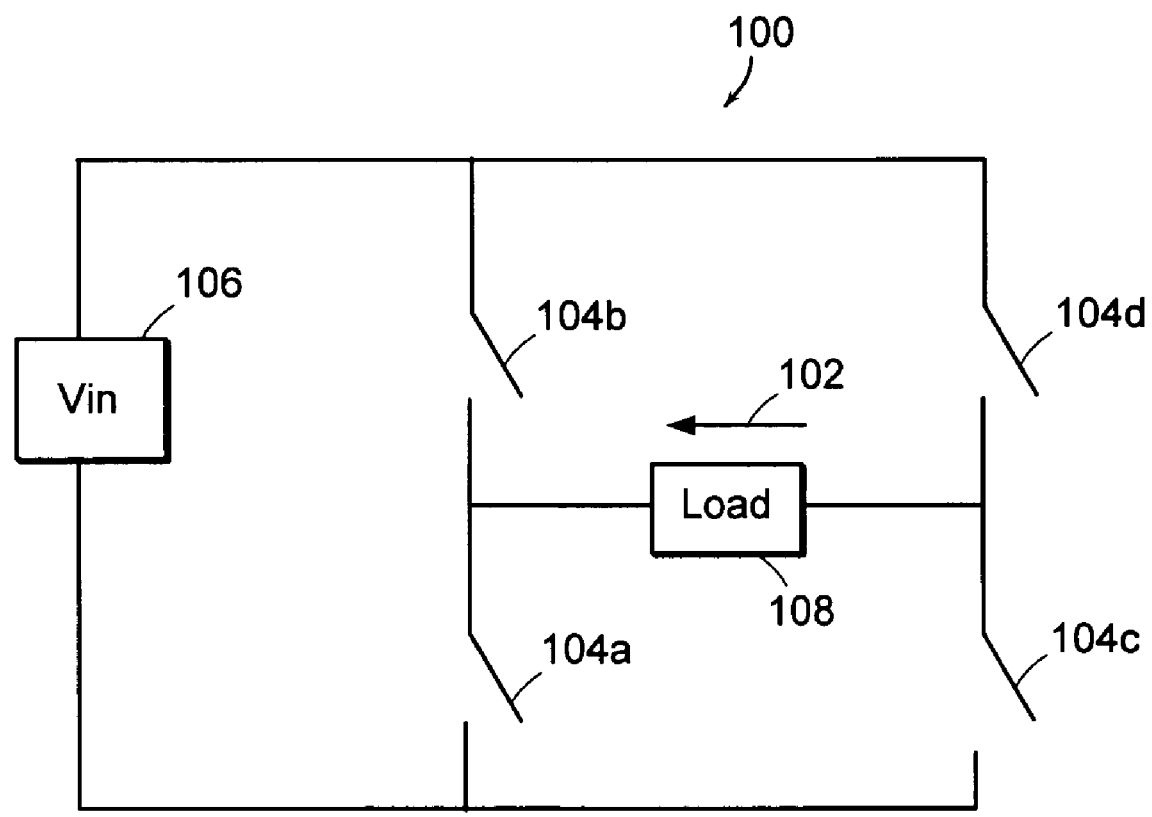
FIG. 1 is a circuit diagram of an exemplary switching power supply.

FIG. 1 depicts an exemplary switching power supply. More particularly, FIG. 1 depicts a full bridge converter circuit 100. As described herein, the full bridge converter circuit 100 is a phase modulated full bridge converter circuit 100, a common choice for high frequency applications. The phase modulated full bridge converter circuit 100 is an exemplary switching power supply for which a load current 102 can be controlled and, in the case of an over current condition, can be quickly corrected by the control circuit 200 (see FIG. 2) according to the invention. It should be noted, however, that the control circuit 200 could, with appropriate modifications, also be used to control and/or correct the load current of other converter circuits, such as, for example, a push-pull converter, a half-bridge converter, or a pulse width modulated full-bridge converter.

As illustrated in FIG. 1, the full bridge converter circuit 100 includes first, second, third, and fourth switches 104a, 104b, 104c, and 104d (generally 104). The full bridge converter circuit 100 also includes a voltage supply 106 (e.g., a DC voltage supply) and a load 108. In this embodiment, the load current 102 is considered to be positive when flowing from the fourth switch 104d through the load 108 to the first switch 104a, and negative when flowing from the second switch 104b through the load 108 to the third switch 104c. The switches 104 may be, for example, metal oxide semiconductor field effect transistors, bipolar transistors, insulated gate bipolar transistors, silicon controlled rectifiers, or other gate controlled switch devices. In one embodiment, the switches 104 have parallel diodes. In another embodiment, the switches 104 are actively controlled for reverse current flow.

In normal operation (i.e., in the absence of an over current condition), when the load current 102 is negative, the second and third switches 104b, 104c open and the first and fourth switches 104a, 104d close, driving the load current 102 positive until a desired level is reached. The fourth switch 104d opens and the third switch 104c closes, applying zero volts across the load 108 so that the load current 102 slowly decays. At the next half cycle, the first switch 104a opens and the second switch 104b closes, applying a negative voltage across the load 108 and driving the load current 102 negative. When the load current 102 reaches the desired negative level, the third switch 104c opens and the fourth switch 104d closes, applying zero volts across the load 108. At the beginning of the next half cycle, the second switch 104b opens and the first switch 104a closes, driving the load current 102 positive and starting the switching sequence over again.

With conventional control circuits, a problem occurs if, for example, the sensing of a positive over current condition, caused by the first and fourth switches 104a, 104d being closed, is delayed or extended until the time that the second and third switches 104b, 104c are closed. Because conventional control circuits measure only the magnitude of the load current 102 and not also its direction, they react, in such a situation, by opening the third switch 104c and closing the fourth switch 104d. Zero volts is therefore applied across the load 108, causing the load current 102 to slowly decay towards zero instead of being actively and rapidly driven towards zero. When the next half cycle begins, the second switch 104b is opened and the first switch 104a is closed. If the load current 102 has not reached zero by the beginning of this half cycle, the load current 102, with the fourth switch 104d being closed, is thus driven even higher, worsening the fault condition. Since the over current condition is not self correcting, the abnormal load current 102 may persist and continue to grow over a number of cycles of operation, resulting, for example, in either shutdown of the full bridge converter circuit 100 or destruction of its switches 104.

If slow or intrinsic diodes are used as a part of the switches 104, the increased load current 102 causes a hard transition of the switches 104 and may cause failure of the switching device. Moreover, the switches 104 may be commanded to change state more than once during the cycle, causing increased dissipation of the switches 104.

Figure 2:
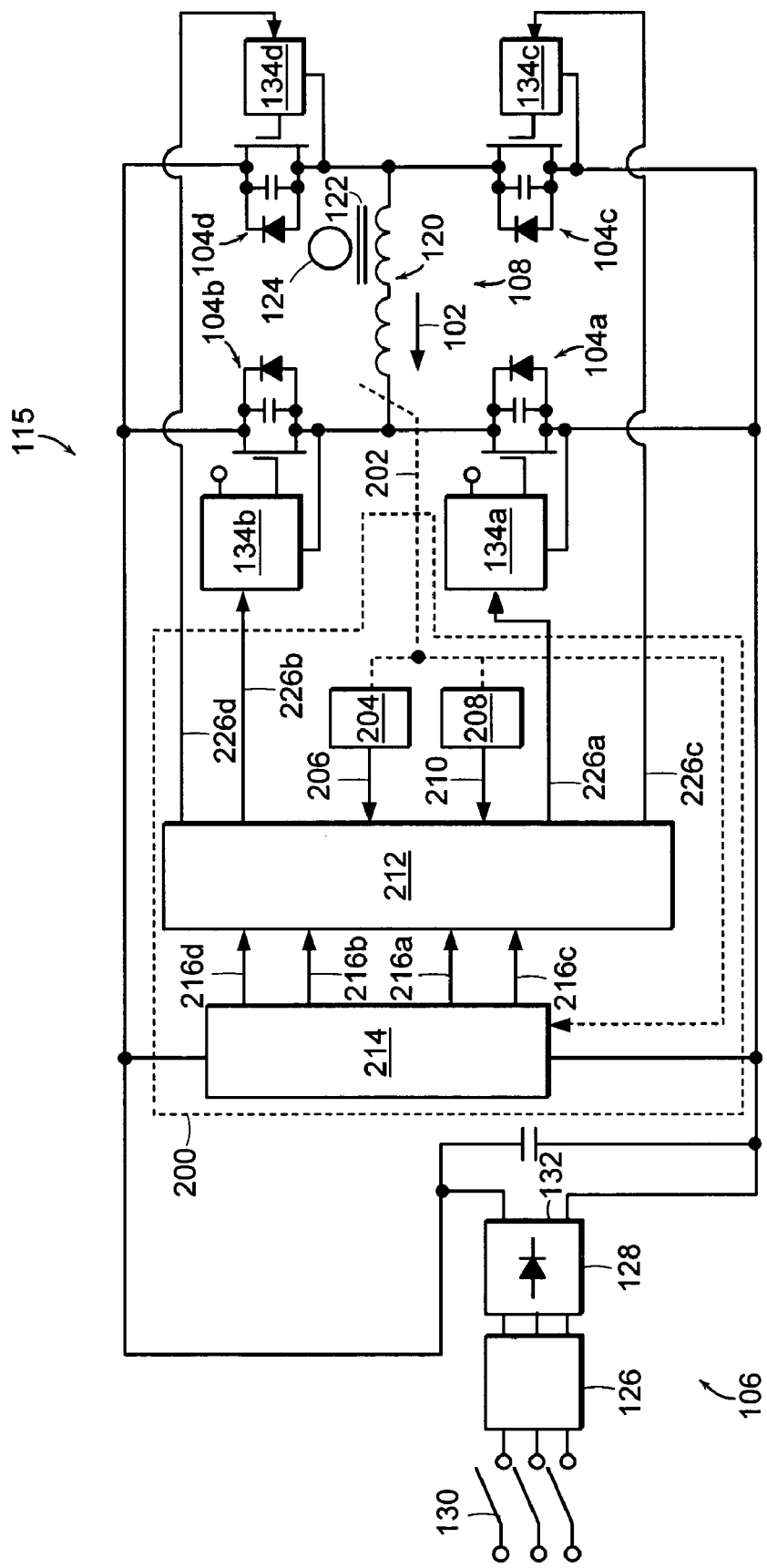
FIG. 2 is a circuit diagram of an exemplary switching power supply, along with a control circuit for the switching power supply in accordance with one embodiment of the invention.
Figure 3:
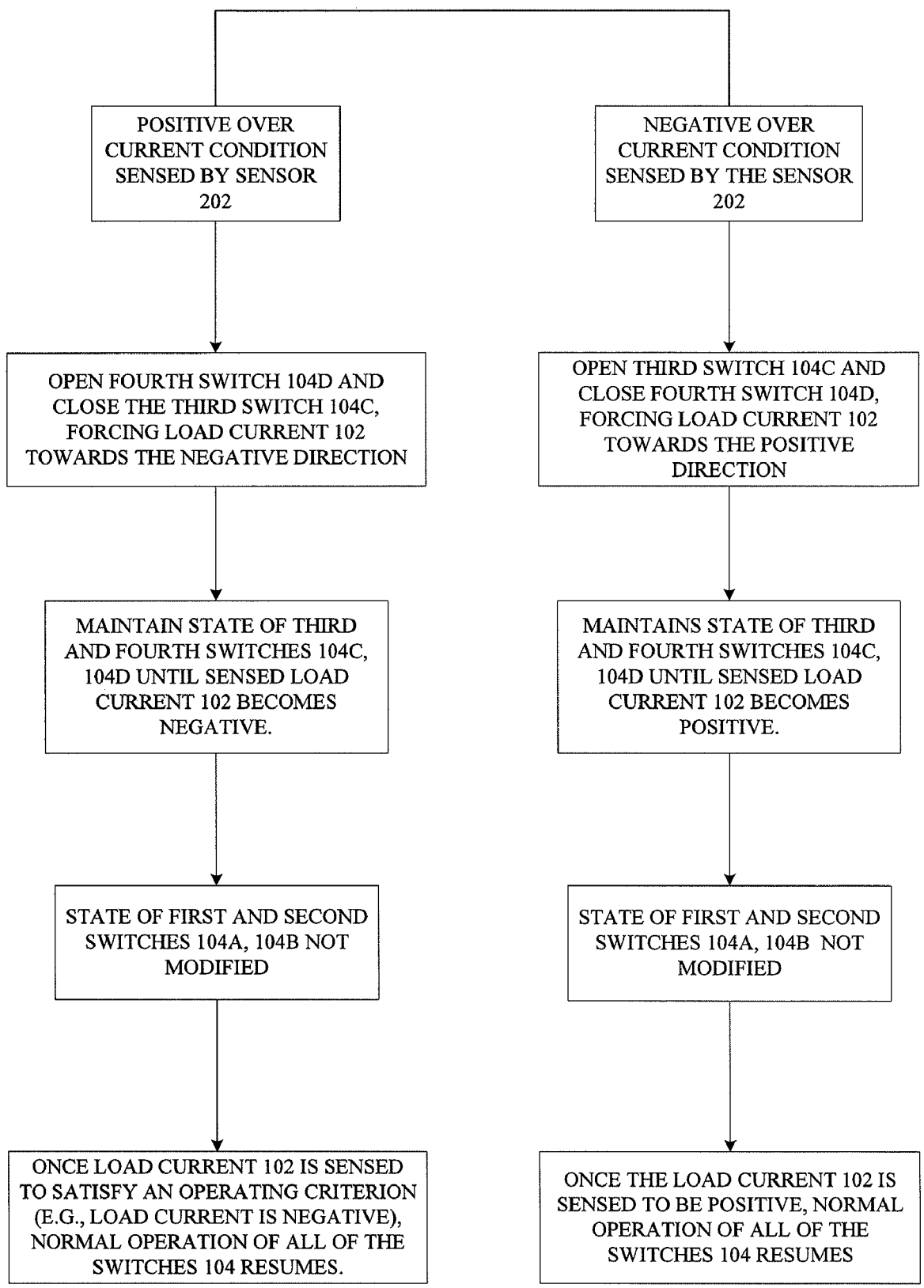
FIG. 3 is a flowchart depicting an algorithm in accordance with one embodiment of the invention.

FIG. 2 depicts one embodiment of a solid state switching power supply 115 implementing the full bridge converter circuit topology of FIG. 1. As illustrated in FIG. 2, a control circuit 200 in accordance with the invention may be used to control the switches 104 of the switching power supply 115.

In one embodiment, as illustrated, the switching power supply 115 is used to drive a primary winding 120 of a transformer. The output of the switches 104 are coupled by the primary winding 120 and a magnetic core 122 to a secondary winding 124. The secondary winding 124 may be, for example, the toroidal plasma described in U.S. Pat. No. 6,150,628 and/or in U.S. Pat. No. 6,552,296, the entire disclosures of which are hereby incorporated herein by reference. In some embodiments, a small amount of inductance (e.g., by including an inductor having a small amount of inductance) is added to the power supply 115 in series with the load 108 to limit current rise in the power supply 115 when, for example, the plasma ignites.

In one embodiment, for example, the switching power supply 115 and the control circuit 200 for the switching power supply 115 are used in the toroidal low-field plasma source described in U.S. Pat. No. 6,150,628 and/or in U.S. Pat. No. 6,552,296. By way of example, the switching power supply 115 and the control circuit 200 for the switching power supply 115 were implemented in an ASTRON® remote plasma source manufactured by MKS Instruments, Inc. of Wilmington, Mass.

More generally, in other embodiments, the switching power supply 115 drives other loads and is used, along with the control circuit 200, for applications other than a toroidal low-field plasma source.

Referring again to FIG. 2, the switching power supply 115 may include a filter 126 and a rectifier circuit 128 that are coupled to a line voltage supply 130. An output 132 of the filter 126 and the rectifier circuit 128 produces a DC voltage. The switching power supply 115 also includes first, second, third, and fourth switch drivers 134a, 134b, 134c, 134d that drive first, second, third, and fourth switches 104a, 104b, 104c, 104d, respectively.

In one embodiment, the control circuit 200 includes a sensor 202 for sensing the load current 102, a high speed direction comparator 204 producing a first digital output 206 for load current direction, a second high speed comparator 208 producing a second digital output 210 for load current magnitude, a programmable logic device 212 for protection implementation, and a circuit 214 that provides first, second, third, and fourth initial digital drive signals 216a, 216b, 216c, 216d for the first, second, third, and fourth switches 104a, 104b, 104c, 104d, respectively. The circuit 214 providing the initial drive signals 216 may be, for example, a UCC3895 phase control integrated circuit (Texas Instruments Inc. of Dallas, Tex.) operated in voltage control mode.

In general, in other embodiments, the entire control circuit 200 is implemented as an integrated circuit, as a set of discrete logic and control elements, as a programmable logic element, or as a program in a processor element.

In one embodiment, the high speed direction comparator 204 analyzes the sensed load current 102 to produce the first digital output 206 for load current direction. Alternatively, in another embodiment, rather than using the high speed direction comparator 204 to directly determine the direction of the load current 102, the direction of the load current 102 is inferred or re-created from a model, a real time simulation of the state of the circuit, or by sensing parameters other than the load current 102.

In one embodiment, to produce the second digital output 210 for load current magnitude, the load current 102 signal is rectified and compared to a reference signal by the second high speed comparator 208. The second digital output 210 indicates the presence or absence of an over current condition in the load 108. In another embodiment, the second digital output 210 for load current magnitude is inferred or re-created from a model, a real time simulation of the state of the circuit, or by sensing parameters other than the load current 102.

The first and second digital outputs 206, 210, and the four initial digital drive signals 216a, 216b, 216c, 216d generated by the circuit 214, are processed by the programmable logic device 212. In one embodiment, the programmable logic device 212 is a digital filter that uses four set-reset flip flops to produce first, second, third, and fourth actual drive signals 226a, 226b, 226c, 226d for the first, second, third, and fourth switches 104a, 104b, 104c, 104d, respectively. Exemplary program code for one embodiment of the programmable logic device 212 is shown in the Appendix following the Detailed Description of Illustrative Embodiments and preceding the claims. This example is code for a programmable logic device (PLD) model XC9536-7VD44I. The source code shown is written in Verilog script. The PLD is placed between a phase modulated full bridge controller chip and the gate drivers. The inputs for the PLD are the four gate drive signals from the controller, the current direction signal, and the over current signal. The outputs are the processed gate drive signals to the power bridge gate drivers.

In one embodiment, the first and second initial drive signals 216a, 216b for the first and second switches 104a, 104b, respectively, pass through the programmable logic device 212 and are not modified by the programmable logic device 212 (i.e., the first and second initial digital drive signals 216a, 216b are equivalent to the first and second actual drive signals 226a, 226b, respectively).

One of the set-reset flip flops of the programmable logic device 212 stores the event of a positive over current condition; it is set when the magnitude of the load current 102 has exceeded setpoint limit in the positive direction (e.g., current magnitude limit that is selected by an operator to protect the power supply 130 or the electrical load 108 during operation of the system) and reset when the polarity of the load current 102 reverses. Another of the set-reset flip flops stores the event of a negative over current condition; it is set when the load current 102 has exceeded a setpoint limit in the negative direction and reset when the polarity of the load current 102 reverses. The other two flip flops store the state of the third and fourth switches 104c, 104d. The third switch 104c is set to the closed state and the fourth switch 104d to the open state if either a positive over current condition occurs, or if the load current 102 is below the limit and the incoming third initial digital drive signal 216c indicates that the third switch 104c should be closed. The third switch 104c is set to the open state and the fourth switch 104d to the closed state if either a negative over current condition occurs, or if the load current 102 is below the limit and the incoming fourth initial digital drive signal 216d indicates that the fourth switch 104d should be closed. This algorithm results in the third and fourth actual drive signals 226c, 226d following the third and fourth initial digital drive signals 216c, 216d, respectively, if the load current 102 is within the limits (e.g., between the positive direction limit and the negative direction limit), and responding optimally if the load current 102 is outside the limits.

Moreover, the algorithm is tolerant of signal path delays. In operation, if, for example, a positive over current condition is sensed by the sensor 202, the control circuit 200 reacts by opening the fourth switch 104d and closing the third switch 104c, forcing the load current 102 towards the negative direction. The control circuit 200 maintains this state of the third and fourth switches 104c, 104d until the sensed load current 102 becomes negative. The first and second switches 104a, 104b continue to open and close as directed by the circuit 214; their state is not modified by the programmable logic device 212. In this manner, the current flow path from the power supply 130 to the electrical load 108 is changed, in accordance with an illustrative embodiment of the invention. Once the load current 102 is sensed to satisfy an operating criterion (e.g., load current is negative), the normal operation of all of the switches 104 resumes.

Similarly, if, for example, a negative over current condition is sensed by the sensor 202, the control circuit 200 reacts by opening the third switch 104c and closing the fourth switch 104d, forcing the load current 102 towards the positive direction. The control circuit 200 maintains this state of the third and fourth switches 104c, 104d until the sensed load current 102 becomes positive. The first and second switches 104a, 104b continue to open and close as directed by the circuit 214; their state is not modified by the programmable logic device 212. Once the load current 102 is sensed to be positive, the normal operation of all of the switches 104 resumes.

In another embodiment, if, for example, an over current condition occurs persistently over both polarities of the load current 102, then the control circuit 200 drives the load current 102 to opposite polarity levels each half cycle. In some embodiments, the states of the third and fourth switches are maintained until the current magnitude satisfies another operating criterion (e.g., the load current magnitude is substantially equal to zero or the load current magnitude is below a predetermined operating value).

Accordingly, because the control circuit 200 senses not only the magnitude of the load current 102, but also its direction, the control circuit 200 is able, in the presence of an over current condition, to rapidly and efficiently drive the load current 102 to zero, eliminating the fault condition. Moreover, a delay in sensing the load current 102 and/or a delay in activating the third and fourth switches 104c, 104d beyond the end of the half cycle does not prevent or hamper the control circuit 200 from eliminating the over current condition.

Additionally, it should be noted that the Applicants intend any operable embodiments existing between the systems, methods, devices, and applications thereof disclosed in the illustrative embodiments described above to be considered within the scope of the inventions disclosed herein and, as such, claimable subject matter.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

APPENDIX

```
module Pwr_Bd_Top(pwm_a,pwm_b,pwm_c,pwm_
d,ilim,pld_ena, ipos, z_drive, dbg_Q1, dbg_Q2);
    input pwm_a;      /*all 4 inputs are inverted by opto*/
    input pwm_b;
    input pwm_c;
    input pwm_d;
    input ilim;   /*=0 for over limit h */
    input ipos;   /*=1 for current flowing from d to a, was b to c*/
    inout pld_ena;
        output [3:0] z_drive;
        output dbg_Q1;
        output dbg_Q2;
    wire [3:0] pwm_n;  /*inverted inputs are positive true here */
        wire dqp;        /*RS flipflops for overcurrent events */
        wire dqpi;
        wire dqn;
        wire dqni;
        wire cq;        /* RS flipflops for c and d outputs */
        wire cqi;
        wire dq;
        wire dqi;
    assign pwm_n [0] = !pwm_a;   /*invert all 4 inputs to get positive
                                   true*/
    assign pwm_n [1] = !pwm_b;       /*a=leading lower fet, c=lagging
                                        lower fet*/
    assign pwm_n [2] = !pwm_c;
    assign pwm_n [3] = !pwm_d;
        assign dqp = !(dqpi & !(!ilim & ipos & dqni & pwm_n [3]));
/*holds overcurrent positive event*/
        //not allowed until dqni=1 no neg event    ; not unless d =1
        assign dqpi = !(dqp & !(!ipos & pwm_n [2]) & !pld_ena);
```

APPENDIX-continued

```
/* =0 when a running, =1 when a stopped */
       assign dqn = !(dqni & !(!ilim & !ipos & dqpi & pwm_n
[2])); /* holds overcurrent negative event */
       // not allowed until dqpi=1 no pos event ; not unless c=1
       assign dqni = !(dqn & !(ipos & pwm_n [3]) & !pld_ena);
       assign cq = !(cqi & !(dqp | (pwm_n[2]& !pwm_n
[3] & (dqpi & dqni )))); /*C set by overcurr pos or normal c*/
       assign cqi = !(cq & !(dqn | (!pwm_n[2] & (dqpi &
dqni )))); /* reset by overcurr neg or normal !c*/
       assign dq = !(dqi & !(dqn | (pwm_n[3]& !pwm_n
[2] & (dqpi & dqni )))); /*set by overcurr neg or normal d*/
       assign dqi = !(dq & !(dqp | (!pwm_n[3] & (dqpi &
dqni )))); /*reset by overcurr pos or normal !d*/
       assign z_drive [0] = pwm_n [0];       /* always a,b pass
                                                  through */
       assign z_drive [1] = pwm_n [1];
//     Temporarily disable algorithm
//     assign z_drive [2] = pwm_n [2];       /* temporarily pass
                                                  through C */
//     assign z_drive [3] = pwm_n [3];       /* temporarily pass
                                                  through D */
       assign z_drive [2] = !cqi;            /*c,d take value of flipflops
                                                  */
       assign z_drive [3] = !dqi;
//     if both set and reset then c,d=0
       assign pld_ena = pwm_n [0]? 1'b0:1'bZ;   /* set ena to
0 if a=1, trisate if a=0 */
// make RC time constant much greater than the period of input a
       assign dbg_Q1 = dqp;                  /*=1 if set by overcurrent*/
       assign dbg_Q2 = dqn;
endmodule
```

What is claimed is:

1. A system for controlling a switching power supply, comprising:
 a voltage supply;
 a plurality of switches electrically connected to the voltage supply to change a current flow path from the voltage supply to an electrical load wherein the plurality of switches is four switches; and
 a control circuit that varies states of two of the four switches, to change the current flow path and to actively drive a load current magnitude towards zero, based on whether the load current magnitude has exceeded a set point in at least one of a positive and negative direction, wherein the states of the two of the four switches are maintained until the load current magnitude is substantially equal to zero and then the control circuit resumes driving the plurality of switches in normal sequence.

2. The system of claim 1 wherein the states of the two of the four switches are maintained until the load current magnitude is below a predetermined operating value.

3. The system of claim 1, comprising a sensor to sense the load current.

4. The system of claim 1 wherein the control circuit is implemented in a manner selected from the group consisting of an integrated circuit, a program in a processor element, a programmable logic element, and a set of discrete logic and control elements.

5. The system of claim 1 wherein the voltage supply is selected from the group consisting of a DC voltage supply and an AC voltage supply.

6. The system of claim 1 wherein the switching power supply outputs a voltage to the electrical load selected from the group consisting of a DC voltage and an AC voltage.

7. The system of claim 1 wherein the plurality of switches are configured in a switching topology of a full bridge converter.

8. The system of claim 1 comprising reverse polarity diodes disposed relative to the plurality of switches to protect the switches from reverse current flow.

9. The system of claim 1 wherein the electrical load comprises a primary winding and a magnetic core coupled to a secondary winding.

10. The system of claim 9 wherein the secondary winding is a toroidal plasma.

11. The system of claim 1 wherein, in the absence of the load current magnitude exceeding the set point in at least one of the positive and negative direction, the switches are controlled by pulse width modulation or pulse frequency modulation.

12. A system for controlling a switching power supply, comprising:
 a voltage supply that supplies a load current that alternates between a positive and negative direction; and
 a control circuit that changes the current flow path from the voltage supply to an electrical load and actively drives the current magnitude towards zero by varying states of two of four switches in the switching power supply, based on whether the load current magnitude has exceeded a set point in at least one of the positive and negative direction, wherein the states of the two of the four switches are maintained until the load current magnitude is substantially equal to zero and then the control circuit resumes driving the four switches in normal sequence.

13. A method for controlling a switching power supply, comprising:
 determining the magnitude and direction of a load current that alternates between a positive direction and a negative direction;
 determining whether the load current magnitude has exceeded a set point in at least one of the positive and negative direction; and
 actively driving the load current magnitude towards zero when the load current magnitude has exceeded the set point in the at least one of the positive and the negative direction by changing states of two of four switches in the switching power supply and maintaining the states of the two of the four switches in the switching power supply until the load current magnitude is substantially equal to zero and then the control circuit resumes driving the four switches in normal sequence.

14. The method of claim 13 wherein the states of the two of the four switches are maintained until the load current magnitude is below a predetermined operating value.

15. The method of claim 13 wherein at least one of the magnitude and direction of the load current is determined by an electrical measurement.

16. The method of claim 13 wherein at least one of the magnitude and direction of the load current is inferred.

17. The method of claim 16 wherein at least one of the magnitude and direction of the load current is inferred based on use of at least one of a model, a simulation, or a measurement.

18. The method of claim 13 comprising supplying power to an electrical load.

19. The method of claim 18 wherein the electrical load comprises a primary winding and a magnetic core coupled to a secondary winding.

20. The method of claim 19 wherein the secondary winding is a toroidal plasma.

21. A system for controlling a switching power supply, comprising:
 means for supplying voltage; and means for changing a current flow path from the voltage supply means to an electrical load and for actively driving a current magnitude towards zero, based on whether a load current magnitude has exceeded a set point in at least one of a positive and negative direction by varying states of two of four switches in the switching power supply, the states of the two of the four switches maintained until the load current magnitude is substantially equal to zero and then the control circuit resumes driving the four switches in normal sequence.

* * * * *